Oct. 26, 1943.  J. G. HOLMSTROM ET AL  2,333,008
TORSION-ROD SUSPENSION FOR TANDEM REAR-WHEEL VEHICLES
Filed April 14, 1941  2 Sheets-Sheet 1

INVENTORS:
John G. Holmstrom
Wallace M. Brown
BY
ATTORNEYS.

Oct. 26, 1943.  J. G. HOLMSTROM ET AL  2,333,008
TORSION-ROD SUSPENSION FOR TANDEM REAR-WHEEL VEHICLES
Filed April 14, 1941  2 Sheets-Sheet 2

INVENTORS:
John G. Holmstrom
Wallace M. Brown
BY
ATTORNEYS.

Patented Oct. 26, 1943

2,333,008

UNITED STATES PATENT OFFICE 2,333,008

TORSION-ROD SUSPENSION FOR TANDEM REAR-WHEEL VEHICLES

John G. Holmstrom and Wallace M. Brown, Seattle, Wash., assignors to Kenworth Motor Truck Corporation, Seattle, Wash., a corporation of Washington Application April 14, 1941, Serial No. 388,488

12 Claims. (Cl. 280—104)

This invention relates to tandem-axle trucks and more particularly to improvements in suspension mechanism for a truck of this nature accomplishing equalization of load between the axles by means of a torsion rod assembly.

The invention has for its general object to provide an axle suspension employing, at each side of the vehicle, a torsion rod assembly common to each of the two tandem axles.

It is a further and a particular object of the invention to provide an axle suspension including a torsion rod characterized in that the rotational wind-up is effected about an axis fixed in relation to the vehicle frame to thereby free the rod entirely from the destructive influences of deflection stresses.

As a still further and particular object, the invention aims to provide a suspension assembly employing what may be termed a full-floating torsion rod in that the rod itself is entirely free of a torsion-resisting frame-anchor and derives its resistance to twist through the instrumentality of having the two axles impart their torsional wind-up to the rod in opposite directions of rotation, the assembly in consequence being one in which only a perpendicular mean of the the resisting forces built up within the rod by the axle-influenced torsional twist is passed into the vehicle frame.

A further and particular object still is to provide, in a torsion-rod suspension having the above advantages, a structural assembly including a minimum of parts and one which is engineered with an ample safety factor to a weight appreciably less than previous tandem-axle suspensions and thereby increases to a corresponding degree the pay-load capacity of the truck.

Other objects and advantages, with the foregoing, will become apparent in the course of the following description and claims, the invention consisting in the novel construction and in the adaptation and combination of parts hereinafter described and claimed.

Figure 1:
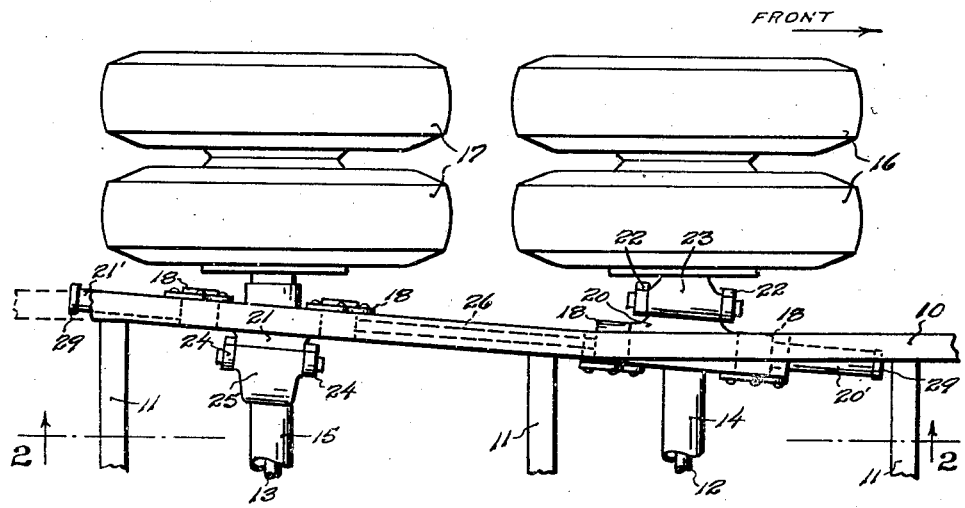
Figure 1 is a fragmentary top plan view illustrating one side of a tandem-axle truck having a torsion-rod suspension constructed and arranged in accordance with the preferred embodiment of the present invention.
Figure 2:
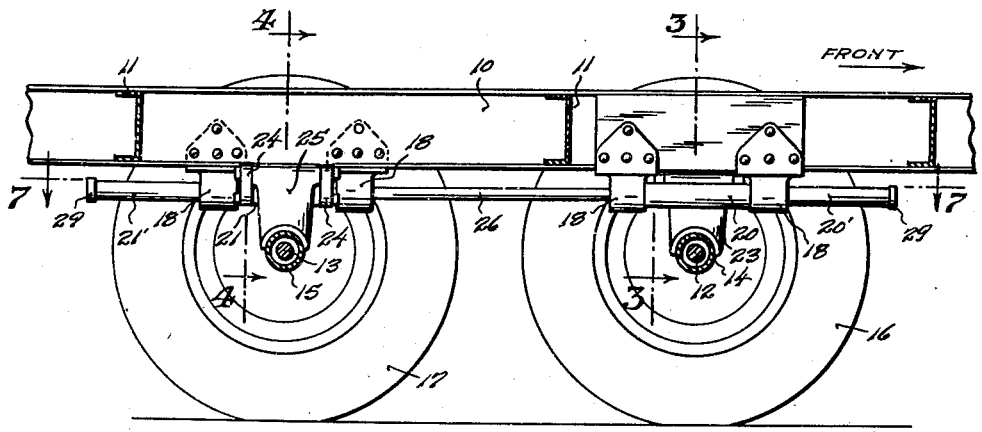
Fig. 2 is a fragmentary longitudinal vertical section on line 2—2 of Fig. 1.
Figure 3:
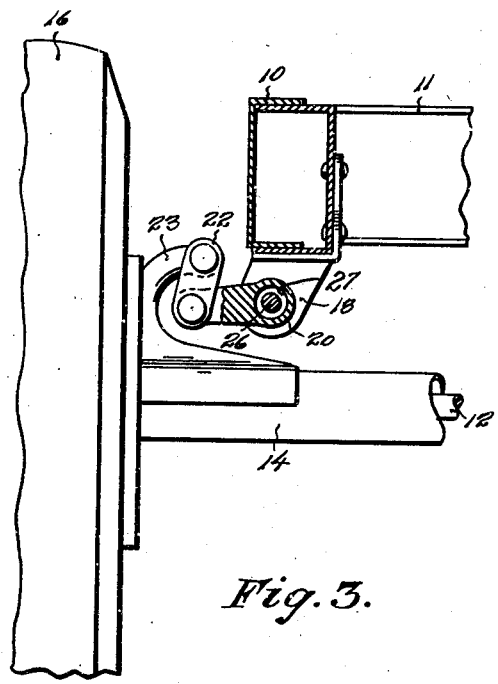
Figure 4:
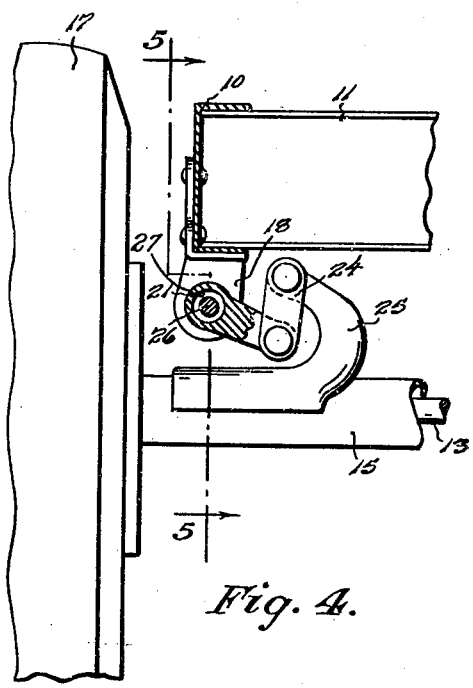

Figs. 3 and 4 are fragmentary transverse vertical sections taken to an enlarged scale on the respective lines 3—3 and 4—4 of Fig. 2 to detail the particular applications of a perch, shackle and lever to each of the two tandem axles to transmit, in opposite directions of rotation, torsional twists to a torsion rod common to both axles.

Figure 5:
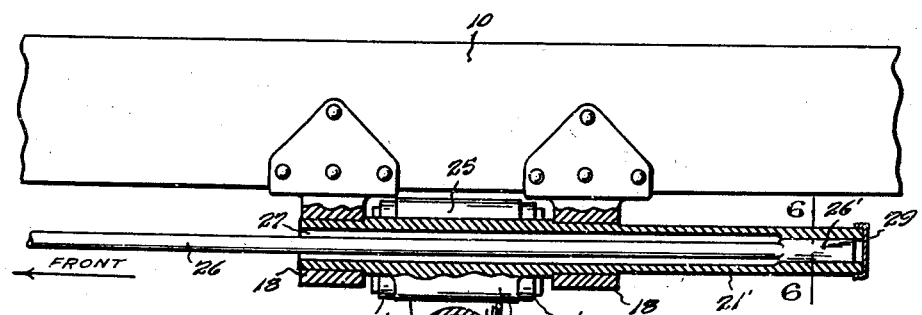

Fig. 5 is a fragmentary longitudinal vertical section taken to a scale enlarged from that of Fig. 4 on the line 5—5 of the latter view.

Figure 6:

Fig. 6 is a transverse vertical section on line 6—6 of Fig. 5; and

Figure 7:
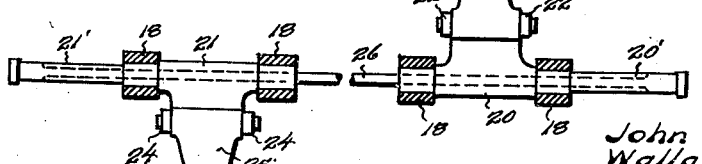

Fig. 7 is a somewhat schematic horizontal section on line 7—7 of Fig. 2.

Having reference to said drawings, the numeral 10 represents one of the main-frame side girders of the truck chassis, and 11 denotes the conventional cross-channels extending transversely between said girder and a corresponding but reversely applied girder at the opposite side of the chassis. 12 and 13 respectively indicate the longitudinally spaced front and rear axles for the tandem rear wheels, 14 and 15 the axle housings, and 16 and 17 the vehicle tires. It will be understood that reference hereinafter is had only to one side of the vehicle and that the described parts each find their counterpart at the opposite side of the frame. Other than as the oscillatory movement of one end of an axle transmits a modified movement to the opposite end, the axle-suspending assembly at one side of the vehicle is entirely independent of its said counterpart at the opposite side.

The girder 10, for a reason which will become apparent in the description of the linkage which suspends the axles therefrom, is given a lateral off-set in the transverse area of the tandem wheels to thereby bring the girder into more proximal relation to the trailing than to the leading wheel of the tandem assembly, and carried in paralleling relation to the girder immediately below the latter are a plurality of co-axial bearings 18. A pair of said bearings are desirably provided for each of the two tandem axles, one lying to the front and the other to the rear of a plane taken perpendicularly through the related axle, and journaled for wrist movement in these paired bearings are levers, as 20 and 21, of which the one disposed forwardly on the girder is directed in an approximately horizontal plane outwardly from the girder and the other in an approximately horizontal plane inwardly therefrom. The reach of the lever in each instance is such as to extend laterally beyond the edge limit of the girder.

Shackled by links 22 to the said forwardly disposed lever is a perch 23 fixedly mounted on the forward axle housing 14, and similarly shackled by links 24 to the other lever 21 is a perch 25 fixedly mounted on the rear axle housing 15, these perches in each instance being preferably carried above the free ends of the related levers and having their shackle mountings so related thereto that rectilineal prolongations of each of the shackles traverse, or approximately traverse, the road surface at the inner point of contact of the tires. It will be apparent from an inspection of Figs. 3 and 4, due to the like pointing of the shackle links as described in an arrangement of which one perch and shackle linkage is coupled to its lever for a directive movement opposite to that of the other perch and linkage, that the rotational geometry is different as between the axles and, unless taken into consideration in the engineering of the assembly, vertical oscillation of the axles with such a variance in angular relation would prevent the load distribution between the axles from remaining equal. We find that we are enabled to give the closest approximation to equal loading on both axles through all phases of the oscillation by governing the length of the shackles as shown, which is to say by providing the lever 21 with shackle links of a greater length than those of the lever 20.

Referring now to the torsion rod of our assembly, indicated by 26, it will be seen that the same is received through center-bores 27 of the two levers and is torsionally coupled at its two ends to said levers by oblong extremities 26' which fit in correspondingly shaped sockets therefor provided at the outer ends of tubular extensions 20'—21' of the levers. The length of these extensions determines the length of the torsion rod, the latter in consequence being relatively unlimited as to length with the result that the assembly is assured the greatest possible flexibility commensurate with the sprung load. Caps 29 which are sweated or otherwise firmly applied over the open ends of the lever extensions 20'—21', by their removal, permit the torsion rod to be driven through the center-bores of the levers where the necessity for a replacement of the rod occurs.

It is believed to be clear that the salient feature of our invention is the fact of the two axles imparting opposite rotational tendencies to a torsion rod common to each. Numerous departures from the illustrated and described embodiment might obviously be resorted to in attaining this end, the departure which most readily comes to mind being one in which two levers for the respective axles, or their functional counterpart, would extend in a like direction from a straight frame girder and have opposite rotational tendencies imparted therefrom to a torsion rod, or to two connected torsion rods, by the employment at one end of the single rod, or as the connection between the two torsion rods, of any one of various forms of reversing mechanism. Stated in more particularity, the referred-to arrangement in which the reversing mechanism would be employed with a single torsion rod would find one end of the torsion rod connected to a related one of the two levers in a manner like or similar to the disclosure of the illustrated embodiment, and with the said reversing mechanism being introduced as an operative interconnection between the opposite end of the torsion rod and the other of the two levers, both levers working in a like rotational direction under the influence of similar oscillatory movements of the axles but through the instrumentality of the reversing mechanism functioning to transmit, to the end of the torsion rod related thereto, a rotational tendency opposite from that of the responsible lever. The various forms in which the referred-to reversing structures might be produced and the manners of engineering the same are largely self-evident having knowledge of the working requirements, and it is here pointed out that we have illustrated and described several such embodiments, modified from the instant disclosure by the incorporation of reversing mechanisms, in our pending application for Letters Patent of the United States, Ser. No. 496,238, and which we have filed as a continuation-in-part of the present application.

While considerable accomplishments have been attained heretofore in the field of torsion-rod springing, we are aware of no prior development in which a torsion rod is applied as the sole means of springing that portion of the sprung mass carried by the tandem rear wheels of a tandem-axle truck. It can be here pointed out that torsion-rod springing, of known axle-suspension systems, probably most nearly approaches the ideal spring suspension in that movement of the sprung mass is slowed to a minimum, especially as it pertains to acceleration and deceleration, with thrusts from the unsprung to the sprung mass being most effectively cushioned to obviate shock forces and in consequence conserving the power loss attributed to distortional influences. Torsion-rod springing additionally has the very important advantage of obviating any need for stabilizers with their resulting increase in the rigidity of the suspension and, in consequence, a promoted intensity in the impact force carried from the unsprung to the sprung mass from road irregularities as well as from braking and driving torque reactions.

It is of course understood, in the engineering of any axle suspension, that the connection between the frame and the tires should be brought as closely as possible to the tires in order thereby to minimize the axle overhang between such point of connection and the center of the wheel assembly, the object being to keep down housing stress. In the instance of our rear connection, namely the connection comprising the perch 25, shackle links 24, and the lever 21, we have sacrificed somewhat such proximity to the tires in favor of eliminating the necessity of adding to a functional counterpart of the illustrated parts such a reversing mechanism as we have mentioned above. In other words, such a reversing mechanism would permit the back-axle connection to substantially duplicate the front-axle connection shown in Fig. 3, but the expectation is that the reversing mechanism would or might have a strong torque reaction into the frame, whereas the preferred embodiment illustrated is such that the torque imparted to the torsion rod by each axle cancels and the effective force carried to the frame is in an upward direction when considered statically.

It can be here mentioned that our diagonal offset produces an angular pivoting of the linkage assemblies, which is to say a pivoting diagonal to the longitudinal median line of the truck, and thereby obtains a trailing or castering effect which appreciably reduces body chatter, tire scuffing, and skidding. We profess no novelty in and to the functional accomplishments of our diagonal pivoting separate and apart from the axle suspension shown and described.

The invention should be clear from the foregoing description taken in connection with the drawings, and it is our intention that no limitations be implied therefrom excepting as such limitations are brought into the hereto annexed claims to distinguish from prior knowledge in the art.

What we claim is:

1. In a tandem-axle vehicle, in combination with the dual rear axles, the axle housings, and a vehicle main frame: a pair of levers disposed in the approximate vertical planes of the axle housings and journaled to the frame for rocker movements about a common axis, said levers extending in opposite directions from said rocker axis; a torsion spring extending between and anchored at its ends to the levers for torsional movement about an axis coinciding with the rocker axis of the levers; a perch fixed to each of the axle housings; and shackle linkage from the perches to the free ends of the levers for imparting, through the levers, opposite rotational tendencies to the two ends of the spring.

2. A vehicle construction according to claim 1 characterized in that the rocker axis of the levers is diagonal to the longitudinal median line of the vehicle, and wherein the shackling pins are movable about axes paralleling the axis of the levers.

3. In a tandem-axle vehicle, in combination with the dual rear axles, the axle housings, and a vehicle main frame: a pair of frame-carried levers formed with elongated hubs journaled in the approximate vertical planes of the axle housings for rocker movements about a common axis, the hubs of said levers being center-bored; a torsion spring common to both levers received through the center-bores thereof and anchored at its ends to the distal ends of said lever hubs; and connection from one of the axle housings to one of the levers and from the other axle housing to the other lever acting by like directive movements of the axle housings to impart opposite rotational tendencies to the two ends of the spring.

4. A vehicle construction according to claim 3 employing tubular extensions of the lever hubs to prolong the spacing between the spring-anchoring distal ends of the levers.

5. In a tandem-axle vehicle, in combination with the dual rear axles, the axle housings, and a vehicle main frame: frame-carried levers for the respective axle housings journaled for rocker movements about a common longitudinal axis; a torsion spring of a length exceeding the span between the axle housings connected at one end to one of the levers and at the other end to the other lever for torsional movement about an axis coinciding with the rocker axis of the levers; and connections from the axle housings to the levers acting by like directive movements of the axle housings to impart opposite rotational tendencies to the two ends of the spring.

6. In a tandem-axle vehicle, in combination with the dual rear axles, and the axle housings: a vehicle main frame providing, at each side thereof, a longitudinally extending girder formed with a diagonal off-set in the transverse area of the dual rear axles, said off-set having its closest proximity to the center line of the vehicle at the forward end thereof; a pair of frame-carried levers journaled immediately below and at the opposite ends of the frame off-set for rocker movement about a common axis generally paralleling the diagonal line of the off-set, the lever which is disposed at the forward end of the off-set being directed outwardly from the girder to have its outer end extend beyond the outer edge limit of the girder and the lever which is disposed at the rear end of the off-set being directed inwardly from the girder to have its outer end extend beyond the inner edge limit of the girder; a torsion spring extending between and anchored at its ends to the levers for torsional movement about an axis coinciding with the rocker axis of the levers; a perch fixed to the housing of the front tandem axle and extending upwardly beyond the outer limit of the forwardly disposed lever to terminate above the free end of the latter; a perch fixed to the housing of the rear tandem axle and extending upwardly beyond the inner limit of the rearwardly disposed lever to terminate above the free end of said rearwardly disposed lever; and shackle linkage from the upper termini of the perches to the respective lever ends.

7. Vehicle construction according to claim 6 characterized in that the shackle linkage from the perches of both of said housing assemblies points outwardly to have rectilineal prolongations of both shackles traverse, or approximately traverse, the road surface at the point of contact of the vehicle tires.

8. As a new suspension arrangement for springing the tandem rear axles of a tandem-axle vehicle from a vehicle main frame which is otherwise unattached to the axle housings: the combination of the housings for the axles; the vehicle main frame; a pair of longitudinally spaced levers supported by the frame for rocker movements about longitudinal axes fixed in relation to the frame; connection from one of said levers to one of the axle housings and from the other lever to the other axle housing functioning by movement of the housings to impart wrist movements to the related levers; and torsion-spring mechanism connected for responsive movement to the levers and extending as a cushion-coupling between the same arranged and adapted to yieldingly oppose like directive movements of the axle housings.

9. In a tandem-axle vehicle, in combination with the tandem axles, the axle housings, and a vehicle main frame: a pair of longitudinally spaced levers formed with elongated hubs supported by the frame for rocker movements about longitudinal axes fixed in relation to the frame, the hubs of said levers being center-bored; connection from one of said levers to one of the axle housings and from the other lever to the other axle housing functioning by movement of the housings to impart wrist movements to the related levers; and torsion-spring mechanism connected for responsive movement to the levers and extending as a cushion-coupling between the same arranged and adapted to yieldingly oppose like directive movements of the axle housings, said torsion-spring mechanism being received through the center bores of the levers and having connection with the latter at the distal ends of the hubs.

10. A vehicle construction according to claim 9 employing tubular extensions of the lever hubs to prolong the spacing between the point of connection of the torsion-spring mechanism with one of the levers and the point of connection of the torsion-spring mechanism with the other lever.

11. As a spring suspension for a tandem through-axle vehicle, wherein each of two tandem rear axles is a bodily-movable unit and is operative at all times to hold the revoluble axis of a vehicle wheel supported at one end thereof in fixed relation to the revoluble axis of a vehicle wheel supported at the other end of the axle, the combination with said tandem through-axles, and with a vehicle main frame; a pair of levers journaled at each side of the frame for rocker movements about axes fixed in relation to the frame; shackle connection from one lever of each pair to a related end of one of the axles and from the other lever of each pair to the related end of the other axle and functioning by vertical movements of the axles to impart wrist movements to the related levers; and a torsion-spring mechanism applied as a cushion-coupling interconnecting the two levers of each pair and arranged and adapted by the resistance thereof to torsional wind-up to yieldingly oppose like directive movements of like ends of the two axles, each axle, excepting for the restraint imposed by the spring suspension, being entirely free of attachment to the frame for said bodily movement thereof with its supported vehicle wheels.

12. As a spring suspension for a tandem-axle vehicle, and in combination with the tandem rear axles, and with a vehicle main frame; a pair of levers spaced longitudinally of and supported by the frame for rocker movements about axes oblique to the longitudinal vertical center line of the frame; connection between one axle and one of the levers and between the other axle and the other lever acting by vertical movements of the axles to impart wrist movements to the related levers, and torsion-spring mechanism applied as a cushion-coupling interconnecting the two levers and arranged and adapted by the resistance thereof to torsional wind-up to yieldingly oppose like directive movements of the two axles, each axle, excepting for the restraint imparted by the spring suspension, being entirely free of attachment to the frame for vertical movement thereof with its supported vehicle wheels.

JOHN G. HOLMSTROM.
WALLACE M. BROWN.